United States Patent

Solomon

[15] 3,675,867

[45] July 11, 1972

[54] MAGNETIC TAPE SPOOL AND CARTRIDGE

[72] Inventor: Nathan L. Solomon, P. O. Box 550, Englewood, N.J. 07631

[22] Filed: June 12, 1970

[21] Appl. No.: 45,812

[52] U.S. Cl. ......................................242/55.19 A, 242/71.8

[51] Int. Cl.........................................................B65h 17/48

[58] Field of Search.....................242/55.19 A, 55.19, 55.18, 242/55.21, 197, 198, 199, 200, 71.8, 71.8 A

[56] References Cited

UNITED STATES PATENTS

| | | | |
|---|---|---|---|
| 3,443,768 | 5/1969 | Liddle et al. | 242/55.19 A |
| 3,482,792 | 12/1969 | Auld | 242/55.19 A |
| 2,853,175 | 9/1958 | Regentrop et al | 242/71.8 X |
| 3,508,719 | 4/1970 | Browning | 242/71.81 |
| 3,326,484 | 6/1967 | Yefsky | 242/55.19 A |

*Primary Examiner*—Billy S. Taylor
*Attorney*—Howard C. Miskin

[57] ABSTRACT

The tape spool in an endless magnetic tape cassette is an integrally one piece molded unit of a polymeric resin and includes a thin circular base, a thin walled coaxial hub including a cylindrical upper section, a lower first conical section extending inwardly from the upper section bottom to the base and a bottom coaxial section extending outwardly from the first conical section medial periphery to the base to delineate a peripheral groove in the hub. A sleeve projects coaxially from the base within the hub and has vertical slots in its lower part connected to radial slots in the base. Radial ridges are formed on the base top face and a circular coaxial ridge in its bottom face proximate the bottom of the first coaxial wall.

6 Claims, 6 Drawing Figures

INVENTOR.
NATHAN L. SOLOMON

BY Howard C. Miskin

ATTORNEY

INVENTOR.
NATHAN L. SOLOMON

BY Howard C. Misker
ATTORNEY

MAGNETIC TAPE SPOOL AND CARTRIDGE

BACKGROUND OF THE INVENTION

The present invention relates generally to improvements in magnetic tape cassettes and cartridges, and it relates particularly to an improved spool for endless magnetic recording tape cassettes, such as used with a multi-track cartridge.

A conventional endless magnetic recording tape cassette in widespread use includes a casing which houses a spool having a hub and a single end flange, and an endless tape wound on the spool. A window is formed in the housing front face behind which is positioned a rubber pressure member and on opposite sides of which are located a guide post and an idler roller. Tape is drawn from the inside of the tape coil wound on the spool, led around the guidepost, across the window, over the idler roller and back onto the outside of the coil of tape. The tape is advanced by a driven capstan engaging the tape and urged toward the idler roller.

An important component of the cassette of the above type is the spool, the satisfactory operation of the cassette depending on the proper construction of the spool. The conventional spool is a multicomponent structure which possesses numerous drawbacks and disadvantages. It is a relatively heavy and expensive device, costly to produce and assemble, and characterized by a lack of uniformity, and the frequent warping and distortion of the assembled spool. Accordingly, the operation of the conventional cassette is unreliable, and the recording and sound reproduction with such a cassette is often distorted and of low fidelity, and the cassette otherwise leaves much to be desired.

SUMMARY OF THE INVENTION

It is a principal object of the present invention to provide an improved magnetic tape cassette or cartridge.

Another object of the present invention is to provide an improved endless magnetic recording tape cartridge.

Still another object of the present invention is to provide an improved tape-supporting spool for endless tape recording cassettes.

A further object of the present invention is to provide an improved spool of the above nature characterized by its low cost and ease of uniform production, its reliability, precision, freedom from distortion and warping and its versatility and adaptability.

The above and other objects of the present invention will become apparent from a reading of the following description taken in conjunction with the accompanying drawing which illustrates a preferred embodiment thereof.

In a sense the present invention contemplates the provision in an endless tape cassette of a spool formed as an integral unit of a synthetic organic polymeric resin and including a substantially flat circular base section, a hollow hub section upwardly, coaxially projecting from and integrally formed with and of lesser diameter than said base section and having a peripheral groove formed in the outer face thereof, and a sleeve coaxial with and of smaller diameter than said hub section and integrally formed with and projecting upwardly from said base section.

In the preferred form of the spool the hub is thin-walled, open at its top, and includes a cylindrical upper section, a lower first conical section extending inwardly from the bottom edge of the upper section to the base, and a bottom second conical section extending outwardly from an intermediate periphery of the first conical section to the base. The confronting underfaces of the conical section below the top of the second conical section delineate a circular groove in the underface of the base. The sleeve terminates below the level of the top of the hub and has circumferentially spread vertical slots in its lower part which join radial slots in the base. Radial ridges are formed on the base top face, and a circular coaxial ridge is formed on the base underface and has an inside diameter about equal to or slightly greater than the outside diameter of the hub top section.

The improved spool is rugged, lightweight, inexpensive, easy to uniformly produce with great precision, distortion and warping of the spool is obviated, and the cassette employing the improved spool is highly reliable and capable of high fidelity reproduction.

DESCRIPTION OF THE PREFERRED EMBODIMENT

Figure 1:
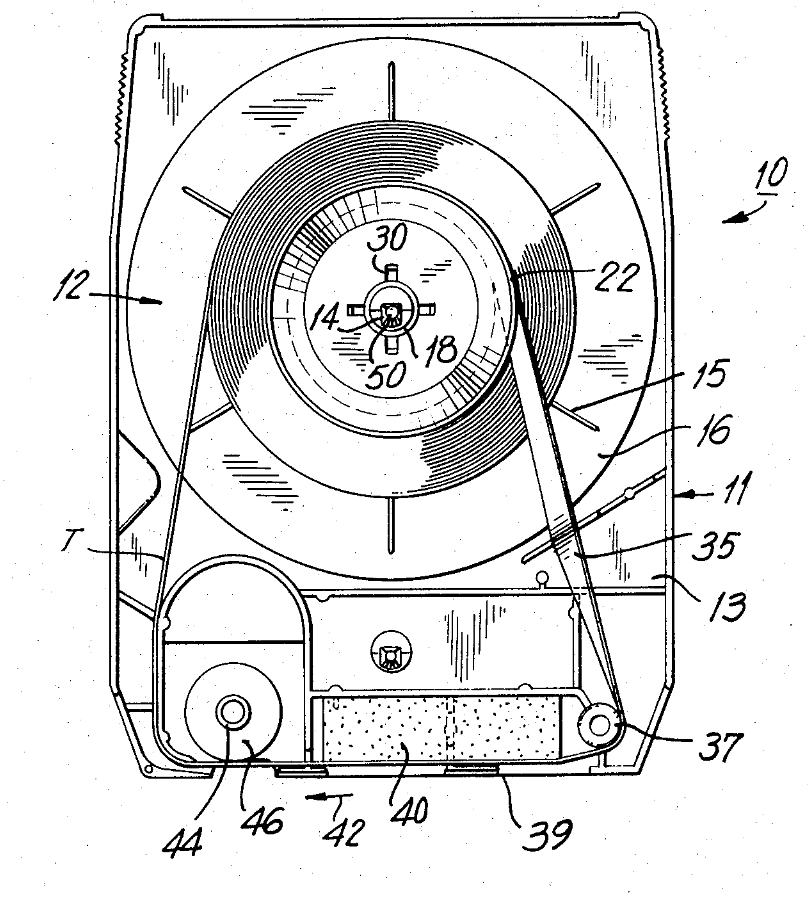
FIG. 1 is a top plan view of an endless tape cassette employing a spool embodying the present invention, with the top wall of the cassette removed.
Figure 2:
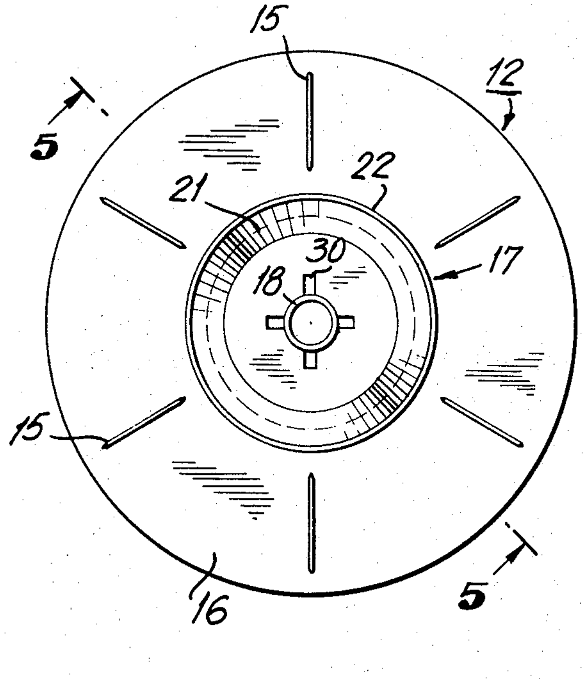
FIG. 2 is a top plan view of the spool.
Figure 3:
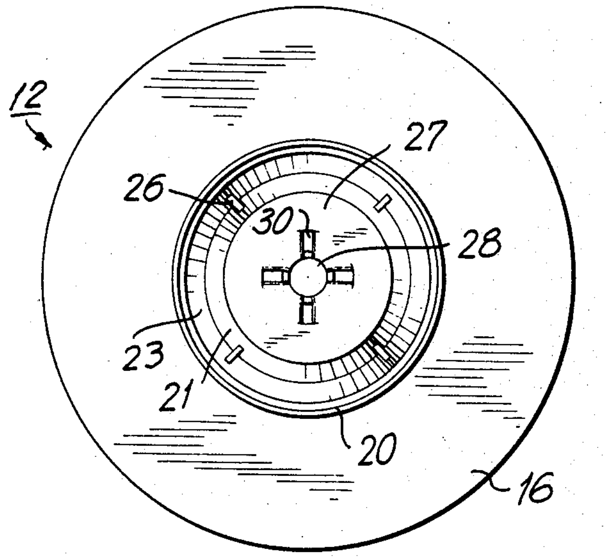
FIG. 3 is a bottom plan view thereof.
Figures 4, 5, 6:
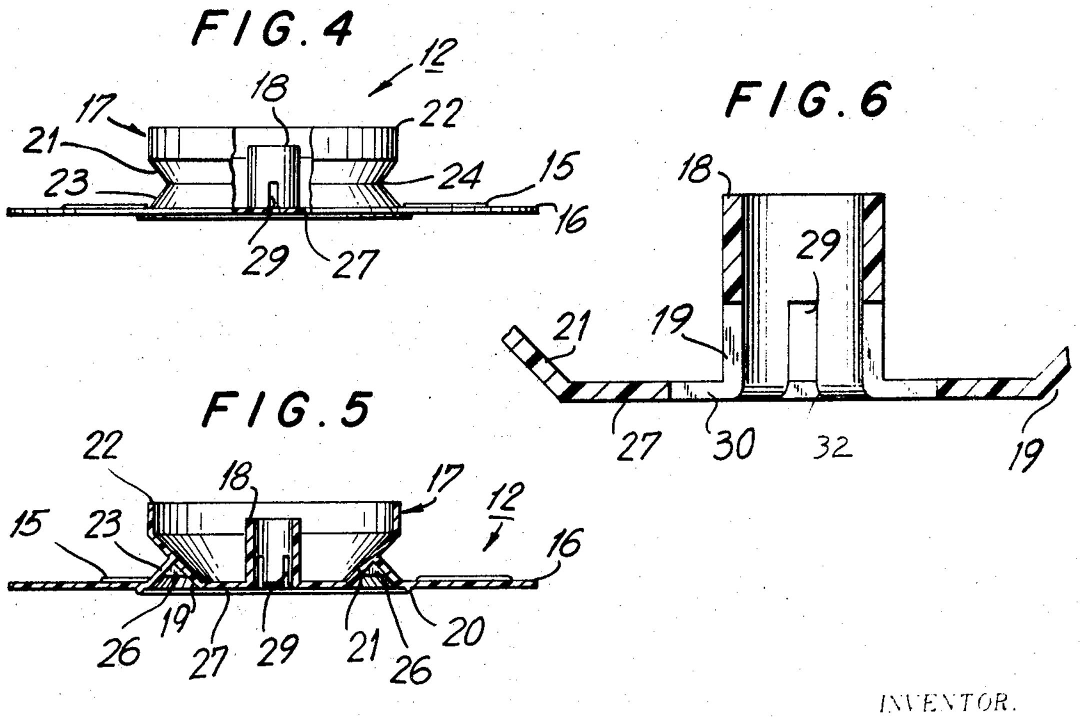
FIG. 4 is an end elevational view thereof, partially broken away to illustrate the sleeve section.
FIG. 5 is a sectional view taken along line 5—5 in FIG. 2.
FIG. 6 is an enlarged detailed fragmentary sectional view similar to FIG. 5.

Referring now to the drawing which illustrates a preferred embodiment of the present invention, the reference numeral 10 generally designates an endless magnetic tape cartridge or cassette, which includes a casing 11 and a single spool 12 constructed in accordance with the present invention. Casing 11 may be of conventional two part construction and formed of any suitable synthetic organic polymeric resin, and includes a bottom wall 13 provided with an upwardly directed axle or post 14 which supports spool 12 housed within casing 11. Casing 11 is provided with the usual tape guides, tape window, with resilient tape backing member, idler roller backing the tape proximate the window, and the other structural features normally associated with an endless tape cassette. As illustrated in FIG. 1, spool 12 is shown substantially full of tape 35, threaded as shown around guide member 37, past the tape window where it passes across a pressure pad 40, which is arranged to hold the tape against an electromagnetic transducer (not shown) for receiving from or recording on the tape electromagnetic signals. The tape 35 is pushed in the direction of arrow 42 by a drive capstan or roller (not shown) associated with the tape deck on which cassette 10 is used. A shaft 44 extends from bottom wall 13 and notably supports a spindle or roller 46. Tape 35 continues about a guide 48 and back onto the outer perimeter of tape wound on spool 12.

Spool 12 is an integrally formed unit which is advantageously produced by injection molding procedures from a suitable synthetic organic polymeric resin, for example, a high impact polystyrene resin or an acetal resin such as Delrin or Celcon. Spool 12 includes a thin flat circular base or flange section 16, an outer coaxial hub section 17, and an inner coaxial sleeve section 18. Formed in base 16 is a coaxial annular slot 19, and a rounded circular ridge 20 which depends from and is coaxial with the underface of base section 16 and is of slightly greater diameter than the outside diameter of slot 19, the ridge 20 facilitating the stacking of spools 12 for shipping purposes and obviating the need for a low friction washer below the mounted spool. In addition, a plurality of angularly spaced shallow radial ridges 15 are formed in the top face of base section 16 and facilitate the optimum support of the spool wound tape, as well as strengthen base section 16.

The hub section 17 comprises a first conical wall 21 extending upwardly and outwardly from the inner peripheral edge of slot 19 and terminating at its top in an upwardly directed cylindrical wall 22 of a diameter approximately equal to the outside diameter of slot 19. A second conical wall 23 extends upwardly and inwardly from the outer peripheral edge of slot 19 to the periphery of conical wall 21 intermediate the top and bottom thereof. The outer faces of the upper part of conical wall 21 and conical wall 23 delineate an angular peripheral groove 24 in hub section 17 between base section 16 and cylindrical wall 22. A plurality of circumferentially spaced, vertical reinforcing webs or gussets 26 are integrally formed with and extend between the lower part of conical wall 21 and wall 23 above the bottom levels thereof.

The inner edge of slot 19 delineates a base inner circular section 27 having a central circular opening 28 therein. Directed vertically upwardly from the edge of opening 28 to a point shortly below the top level of hub section 17 is the coaxial sleeve 18 which has an inside diameter slightly greater than the diameter of post 14. A plurality of circumferentially spaced vertical slots 29 are formed in the lower part of sleeve 18 and slots 29 join at their bottoms corresponding radial slots 30 formed in base inner section 27. The opposite bottom parallel edges of slots 30 are rounded as at 32. Slots 29 and 30 may function to engage suitably shaped keys on a winding shaft.

Spool 12 is a unitary device with all the elements and components thereof being integrally formed such as by injection molding and requires no subsequent assembly. It has been found that although the spool 12 is simpler, less expensive and considerably lighter than the conventional spool, it is characterized by the absence of distortion and warping which are generally found in the conventional spools, and by high precision, great uniformity, low friction and abrasion, and great reliability of operation. Spool 12 is employed in the usual manner, and is mounted on post 14 in cassette casing 11, and carries an endless magnetic tape 35 wound into a coil C on hub 17, tape 35 being withdrawn from the inside of coil C by way of hub groove 24 and being rewound onto the outside of coil C. The difference in speed between the tape leaving coil C from the inside of the coil and returning on the outside is made up by the loose winding of the coil on the spool.

Advantageously the inside diameter of bead or ridge 20 is substantially equal to the outside diameter of cylindrical wall 22 of hub section 17. This configuration allows a group of tape spools to be stacked with the top of the hub section of one frictionally received within the ridge 20 of the adjoining tape spool, and continuing on to form a generally unitary group of spools for shipment. Further, as mentioned above, ridge 20 prevents the circumferential edge of flange 16 from touching the side or bottom of casing 11.

The rounded edges 32 of slots 30 eliminate sharp edges which rub against the bottom wall 13 of casing 11 or a washer, not shown, and shave pieces of material of the washer or casing that it rubbed against, which pieces of material were oftentimes picked up by the tape and spools, and built up, which interfered with the operation of the cartridge.

Advantageously, post 14 contains a hook or snap 50 which cooperates with a lip (not shown) on the upper wall of the casing to hold the posts together. Post 52 contains an opening 54 which receives a self-tapping screw for removably holding the top surface of the cartridge 10 in place. This allows checking the inside of the cartridge when desired.

While there has been described and illustrated a preferred embodiment of the present invention it is apparent that numerous alterations, omissions and additions may be made without departing from the spirit thereof.

What I claim is:

1. In an endless magnetic recording tape cassette the improvement comprising a tape spool located in said cassette and formed as an integral unit of a synthetic organic polymeric resin and including a substantially flat circular base section, a hollow hub section upwardly, coaxially projecting from and integrally formed with and of lesser diameter than said base section and having a peripheral groove formed in the outer face thereof, and a sleeve coaxial with and of smaller diameter than said hub section and integrally formed with and projecting upwardly from said base section, said hub section including an upper cylindrical wall, a lower first conical wall extending radially inwardly from the lower edge of said cylindrical wall to said base section, and a bottom second conical wall integral with and extending from a periphery of said first conical wall intermediate the top and bottom thereof to said base section, the confronting underfaces of said conical walls diverging downwardly to delineate a circular groove in the underface of said base section.

2. The spool of claim 1, including a plurality of circumferentially spaced radially extending ridges formed on the top face of said base section.

3. The spool of claim 1, including a plurality of circumferentially spaced radially extending ridges formed on the top face of said base section and a coaxial circular ridge formed on the underface of said base section proximate the bottom edge of said second conical wall.

4. The spool of claim 1, wherein said sleeve terminates at a level below the top of said hub and has a plurality of circumferentially spaced vertical slots formed in the lower part thereof and said base section has radial slots formed therein communicating with said vertical slots and terminating short of the wall of said hub.

5. The spool of claim 1, including a circular ridge coaxially formed on the underface of said base section and of larger inside diameter than the outside diameter of said sleeve.

6. The spool of claim 1 wherein said peripheral groove top and bottom faces are symmetrical and conical.

* * * * *